(12) United States Patent
Mathew et al.

(10) Patent No.: US 7,179,942 B2
(45) Date of Patent: Feb. 20, 2007

(54) HALO-SUBSTITUTED ACTIVE METHYLENE COMPOUNDS

(75) Inventors: Joy Mathew, Karnataka (IN); Tom Thomas Puthiaparampil, Karnataka (IN); Madhavan Sridharan, Karnataka (IN); Padudevastana Sathya Shanker, Karnataka (IN); Sambasivam Ganesh, Karnataka (IN)

(73) Assignee: Bicon Limited, Electronics City (PC)

( * ) Notice: Subject to any disclaimer, the term of this patent is extended or adjusted under 35 U.S.C. 154(b) by 0 days.

(21) Appl. No.: 10/483,533

(22) PCT Filed: Jun. 9, 2003

(86) PCT No.: PCT/IN03/00216

§ 371 (c)(1),
(2), (4) Date: Dec. 8, 2004

(87) PCT Pub. No.: WO2004/108660

PCT Pub. Date: Dec. 16, 2004

(65) Prior Publication Data

US 2005/0113607 A1   May 26, 2005

(51) Int. Cl.
C07C 233/07   (2006.01)
(52) U.S. Cl. ...................... 564/169; 564/199
(58) Field of Classification Search ............... 564/169, 564/199
See application file for complete search history.

(56) References Cited

U.S. PATENT DOCUMENTS

| | | | |
|---|---|---|---|
| 5,124,482 A | 6/1992 | Butler et al. | |
| 5,216,174 A | 6/1993 | Butler et al. | |
| 6,274,740 B1 | 8/2001 | Lin et al. | |
| 6,388,093 B1 * | 5/2002 | Chamberlain et al. | 548/453 |
| 6,528,661 B2 | 3/2003 | Niddam et al. | |
| 2002/0099224 A1 | 7/2002 | Niddam et al. | |
| 2003/0114685 A1 | 6/2003 | Niddam-Hildesheim et al. | |
| 2003/0175338 A1 | 9/2003 | Singh et al. | |

FOREIGN PATENT DOCUMENTS

| | | |
|---|---|---|
| WO | WO 97/03960 | 2/1997 |
| WO | WO 02/43667 A2 | 6/2002 |
| WO | WO 03/004450 A1 | 1/2003 |
| WO | WO 03/004455 A2 | 1/2003 |
| WO | WO03/004456 | 1/2003 |
| WO | WO 03/016317 A1 | 2/2003 |

OTHER PUBLICATIONS

Davis et al, J. Org. Chem., 1995, vol. 60, pp. 4730-4737.*
Korinek et al, Coll. Czech. Chem. Comm., vol. 44, 1460-1467, 1979.*
International Search Report for corresponding PCT application PCT/IN03/00216, 2003.

Oehrlein R et al., "Chemoenzymatic approach to statin side-chain building blocks" Advanced Synthesis Catalysis (2003), 345 (6+7), 713-715.

Woó et al., "Atorvastatin, an HMG-CoA reductase inhibitor and effective lipid-regulating agent. Part III. Syntheses of [2H5]-, [13C8], and [13C7, 15N] atorvastatin and their application in metabolic and pharmacokinetic studies", Journal of Labeled Compounds Radiopharmaceuticals (1999), 42(2), 135-145.

Lee et al., "Atorvastatin, an HMG-CoA reductase inhibitor and effective lipid-regulating agent. Part II. Synthesis of side chain-labeled [14C] atorvastatin", Journal of Labeled Compounds Radiopharmaceuticals (1999), 42(2), 129-133.

Woo et al., "Atorvastatin, an HMG-CoA reductase inhibitor and effective lipid-regulating agent. Part I. Synthesis of ring-labeled [14C] atorvastatin", Journal of Labeled Compounds Radiopharmaceuticals (1999), 42(2), 121-127.

Radl et al., "An improved synthesis of 1,1-dimethylethyl-6-cyanomethyl-2,2-dimethyl-1,3-dioxane-4-acetate, a key intermediate for atorvastatin synthesis", Tetrahedron Letters (2002), 43(11), 2087-2090.

(Continued)

*Primary Examiner*—Shailendra Kumar
(74) *Attorney, Agent, or Firm*—Andrea L. C. Robidoux; Choate, Hall & Stewart

(57) ABSTRACT

In one aspect, the invention provides a process for the preparation of a compound of Formula I

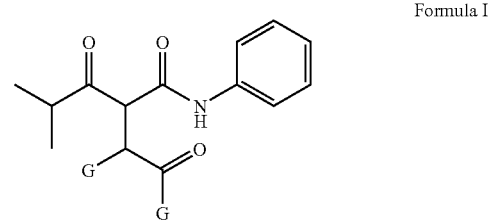

Formula I wherein G is alkyl or aryl, by employing a novel halo-substituted active methylene compound of Formula III

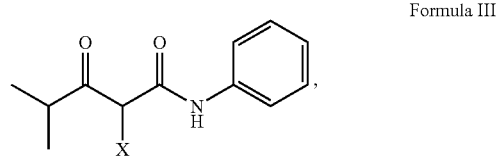

Formula III wherein X is halogen, and process of preparation thereof.

7 Claims, No Drawings

OTHER PUBLICATIONS

Manzoni et al., "Biosynthesis and biotechnological production of statins by filamentous fungi and application of these cholesterol-lowering drugs", Applied Microbiology and Biotechnology (2002), 58(5), 555-564.

Roth, Bruce D., "The discovery and development of atorvastatin, a potent novel hypolipidemic agent", Progess in Medicinal Chemistry (2002), 40, 1-22.

Wierzbicki, Anthony S., "Atorvastatin", Expert Opinion on Pharmacotherapy (2001), 2(5), 819-830.

Graul et al., "Atorvastatin calcium", Drugs of the future (1997), 22(9), 956-968.

Baumann et al., "The convergent synthesis of CI-981, an optically active, highly potent, tissue-selective inhibitor of HMG-CoA reductase", Tetrahedron Letters (1992), 33(17), 2283-2284.

* cited by examiner

HALO-SUBSTITUTED ACTIVE METHYLENE COMPOUNDS

PRIORITY CLAIM

The present application claims the benefit under 35 U.S.C. § 371 of International Application No.: PCT/IN03/00216, filed Jun. 9, 2003, the entire contents of this application is hereby incorporated herein by reference.

FIELD OF THE INVENTION

The present invention relates to novel halo-substituted active methylene compounds and a process for preparation of the same. More particularly, the present invention relates to a process for the preparation of compounds of Formula I by employing novel halo-substituted active methylene compounds of Formula III.

BACKGROUND OF THE INVENTION

U.S. Pat. Nos. 5,124,482 and 5,216,174 disclose the manufacture and use of 4-Fluoro-α-[2-methyl-1-oxopropyl] γ-oxo-N-β-diphenylbenzenebutane amide for the preparation of [R-(R*,R*)]-2-(4-Fluorophenyl)-β,δ-Dihydroxy-5-(1-Methylethyl)-3-Phenyl-4-[(Phenylamino)Carbonyl]-1h-Pyrrole-1-Heptanoic Acid. [R-(R*,R*)]-2-(4-Fluorophenyl)-β,δ-Dihydroxy-5-(1-Methylethyl)-3-Phenyl-4-[(Phenylamino)Carbonyl]-1[[h]]H-Pyrrole-1-Heptanoic Acid is an inhibitor of HMG CoA reductase and can thus be used as an antihypercholesterolemic agent.

SUMMARY OF THE INVENTION

In one aspect, the present invention provides compounds of Formula III

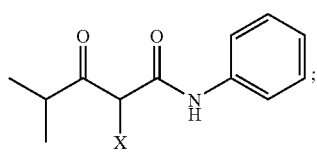

Formula III wherein X is halogen, which are useful intermediates for an improved process for the preparation of 4-Fluoro-α-[2-methyl-1-oxopropyl]γ-oxo-N-β-diphenylbenzenebutaneamide. See Scheme 1.

Scheme I

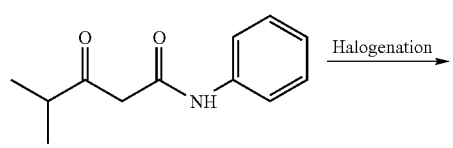

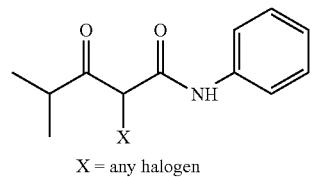

X = any halogen

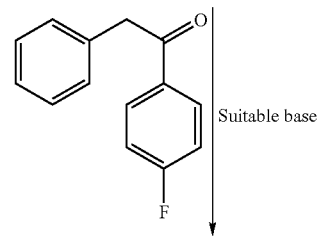

Suitable base

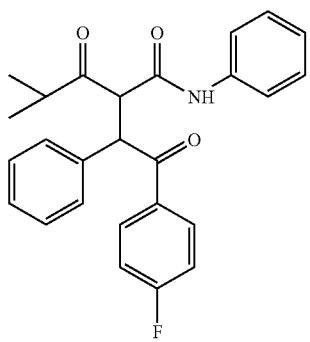

In another aspect, the present invention relates to a process for preparation of novel intermediates of Formula III

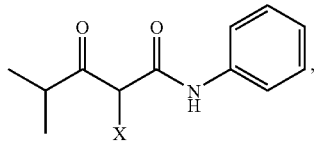

Formula III where X is halogen.

In yet another aspect, the present invention relates to a process for preparation of compounds of Formula I

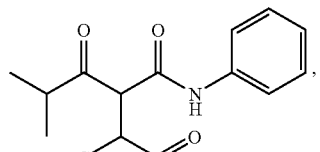

Formula I wherein G is alkyl or aryl.

In one embodiment, compounds of Formula I are prepared by a process comprising, halogenating a compound of Formula II

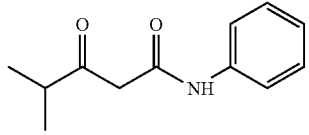

Formula II to afford a compound of Formula III

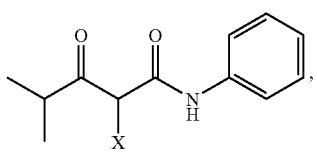

Formula III wherein X is halogen; and reacting the compound of Formula III

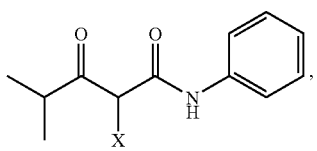

Formula III wherein X is halogen, with a compound of Formula IV

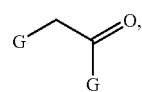

Formula IV wherein G is alkyl or aryl.

DETAILED DESCRIPTION OF CERTAIN PREFERRED EMBODIMENTS OF THE INVENTION

Compounds of Formula I are important intermediates for the preparation of drug molecules, especially HMG Co-A reductase inhibitors. The HMG Co-A reductase inhibitors are useful as inhibitors of the enzyme 3-hydroxy-3-methyl-glutaryl-coenzyme A reductase (HMG CoA reductase) and are thus useful as hypolipidemic or hypocholesterolemic agents.

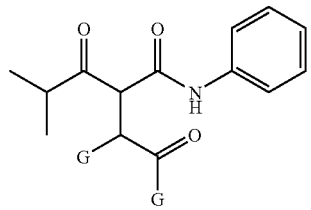

Formula I wherein G is alkyl or aryl.

In one aspect, the process of the present invention is a new, economical, and commercially feasible method for preparing intermediates used for the preparation of HMG CoA reductase inhibitors.

In one embodiment, compounds of Formula I are prepared by a process comprising, halogenating a compound of Formula II

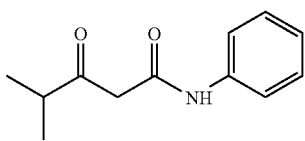

Formula II to afford a compound of Formula III

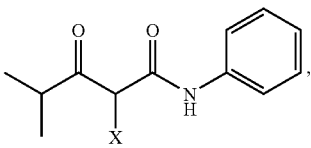

Formula III wherein X is halogen; and reacting the compound of Formula III

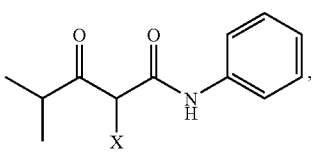

Formula III wherein X is halogen, with a compound of Formula IV

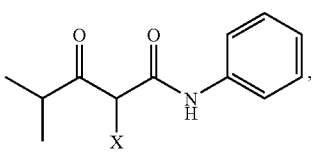

Formula IV wherein G is alkyl or aryl.

In one embodiment, the step of halogenating the compound of Formula II is carried out in the presence of reagents selected from Bromine, N-bromosuccinimide, thionyl chloride, $Br_2(CN)_2$, 4-(dimethylamino)pyridinium bromide or any such suitable halogenating agent.

The compounds of Formula III can be further used for the preparation of 4-Fluoro-α-[2-methyl-1-oxopropyl]γ-oxo-N-β-diphenylbenzene butane amide, which is a key intermediate for the manufacture of [R-(R*,R*)]-2-(4-Fluorophenyl)-β,δ-Dihydroxy-5-(1-Methylethyl)-3-Phenyl-4-[(Phenyl amino) Carbonyl]-1h-Pyrrole-1-Heptanoic Acid (e.g., by reacting them with a compound of Formula IV).

In certain embodiments, the step of reacting the compound of Formula III with a compound of Formula IV is carried out in the presence of reagents selected from Lithium diisopropylamide, sodium hydride n-butyllithium, sodium ethoxide or any such suitable base.

The illustrated embodiments have been set forth only for the purposes of example, and should not be taken as limiting the invention. Therefore it should be understood that, within the scope of the appended claims, the invention may be practiced other than specifically described herein.

EXAMPLE 1

Preparation Of 2-Bromo-4-methyl-3-oxo-Pentanoic Acid Phenylamide

Liquid bromine (7.8 g, 0.048 mol) was added to a solution of 4-Methyl-3-oxo-pentanoic acid phenylamide (10 g, 0.048 mol) in chloroform (100 mL). After stirring for 30 minutes, the reaction mixture was concentrated and the product was isolated by column chromatography(silica gel: 60–120 mesh, eluent: Pet. Ether/ethyl acetate—60:40)

Yield: 11.0 g, 80%

EXAMPLE 2

Preparation Of 2-Bromo-4-methyl-3-oxo-Pentanoic Acid Phenylamide

N-bromosuccinimide (8.5 g, 0.048 mol) was added to a solution of 4-Methyl-3-oxo-pentanoic acid phenylamide (10 g, 0.048 mol) in acetone 100 mL.). After stirring for 3 hours, the reaction mixture was concentrated and product was isolated by crystallization from Pet. Ether/ethyl acetate.

Yield: 12.5 g, 92%

EXAMPLE 3

Preparation Of 4-Fluoro-α-[2-methyl-1-oxopropyl] γ-oxo-N-β-Diphenylbenzene Butane Amide A solution of n-butyl lithium (35 mL, 1.6 M, 0.056 mol) in hexane was added dropwise to a chilled solution of diisopropylamine (8 mL, 0.056 mol) in dry THF(50 mL), under nitrogen atmosphere, maintaining the temperature between −10° C. and −25° C. The resulting mixture was stirred for 30 minutes at the same temperature. A solution of 1-(4-Fluoro-phenyl)-2-phenyl-ethanone (10 g, 0.047 mol) in THF (20 mL) was added dropwise to the reaction mixture, maintaining the temperature between −60° C. and −78° C. The resulting mixture was stirred for 1 hour at the same temperature. A solution of 2-Bromo-4-methyl-3-oxo-pentanoic acid phenylamide (13.4 g, 0.047 mol) in THF (30 mL) was added dropwise to the reaction mixture, maintaining the temperature between −60° C. and −78° C. The resulting mixture was stirred for 30 minutes, was slowly warmed to 10–15° C. over a period of 1 hour, and was quenched with water (50 mL). The product was extracted with ethyl acetate (2×50 mL). The combined organic extract was washed with water (2×50 mL) and brine (2×50 mL), and concentrated to obtain title compound.

Yield: 16 g, 85%.

EXAMPLE 4

Preparation Of 4-Fluoro-α-[2-methyl-1-oxopropyl] γ-oxo-N-β-Diphenylbenzene Butane Amide A solution of n-butyl lithium (35 mL, 1.6 M, 0.056 mol) in hexane was added dropwise to a chilled solution of diisopropylamine (8 mL, 0.056 mol) in dry THF (50 mL), under nitrogen atmosphere, maintaining the temperature between −10° C. and −25° C. The resulting reaction mixture was stirred for 30 minutes at the same temperature. A solution of 1-(4-Fluoro-phenyl)-3-methyl-butan-1-one (8.4 g, 0.047 mol) in THF (20 mL) was added dropwise to the reaction mixture, maintaining the temperature between −60° C. and −78° C. The resulting reaction mixture was stirred for 1 hour at the same temperature. A solution of 2-Bromo-4-4-methyl-3-oxo-pentanoic acid phenylamide (13.4 g, 0.047 mol) in THF (30 mL) was added dropwise to the reaction mixture, maintaining the temperature between −60° C. and −78° C. The resulting mixture was stirred for 30 minutes, slowly warmed 10–15° C. over a period of 1 hour, and quenched with water (50 mL). The product was extracted with ethyl acetate (2×50 mL). Combined organic extract was washed with water (2×50 mL) and brine (2×50 mL), and concentrated to obtain title compound.

Yield: 15 g, 87%.

We claim:

1. A process for preparing a compound of Formula I

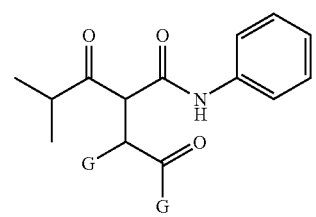

Formula I wherein G is lower alkyl or substituted or unsubstituted phenyl, comprising:

reacting a compound of Formula III

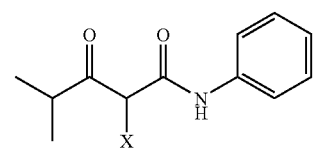

Formula III wherein X is halogen;

with a compound of Formula IV

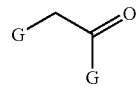

Formula IV wherein G is alkyl or aryl.

2. The process of claim 1, wherein the reaction between compounds of Formula III and Formula IV is carried out in the presence of a suitable base.

3. The process of claim 1, wherein the compound of Formula III

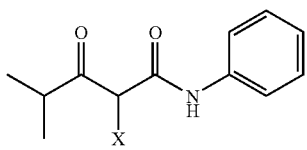

Formula III wherein X is halogen, is prepared by halogenation of a compound of Formula II

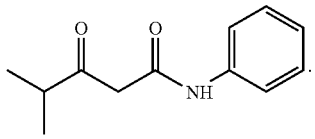

Formula II

4. The process of claim 3, wherein the halogenation is carried out in the presence of a suitable halogenating agent.

5. The process of claim 2, wherein the base is lithium diisopropylamide, sodium hydride n-butyllithium, or sodium ethoxide.

6. The process of claim 4, wherein the halogenating agent is Bromine, N-bromosuccinimide, thionyl chloride, $Br_2(CN)_2$, or 4-(dimethylamino)pyridinium bromide.

7. The process of claim 4, wherein the halogenating agent is Bromine or N-bromosuccinimide.

* * * * *